Sept. 11, 1934.　　　J. N. JACOBSEN　　　1,973,531
METHOD FOR TREATING LIQUIDS
Filed Jan. 21, 1932　　3 Sheets-Sheet 1
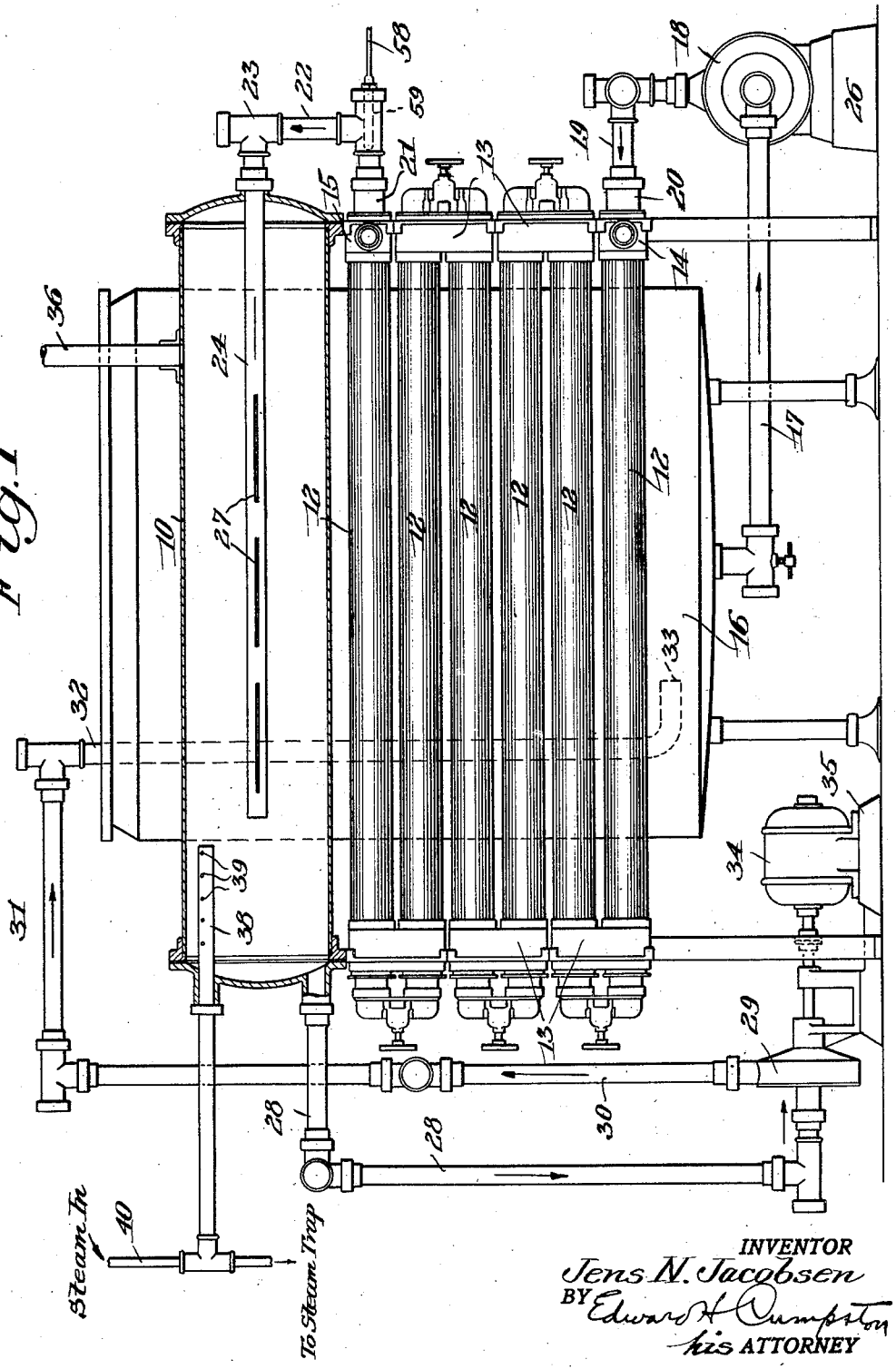
INVENTOR
Jens N. Jacobsen
BY Edward H. Cumpston
his ATTORNEY

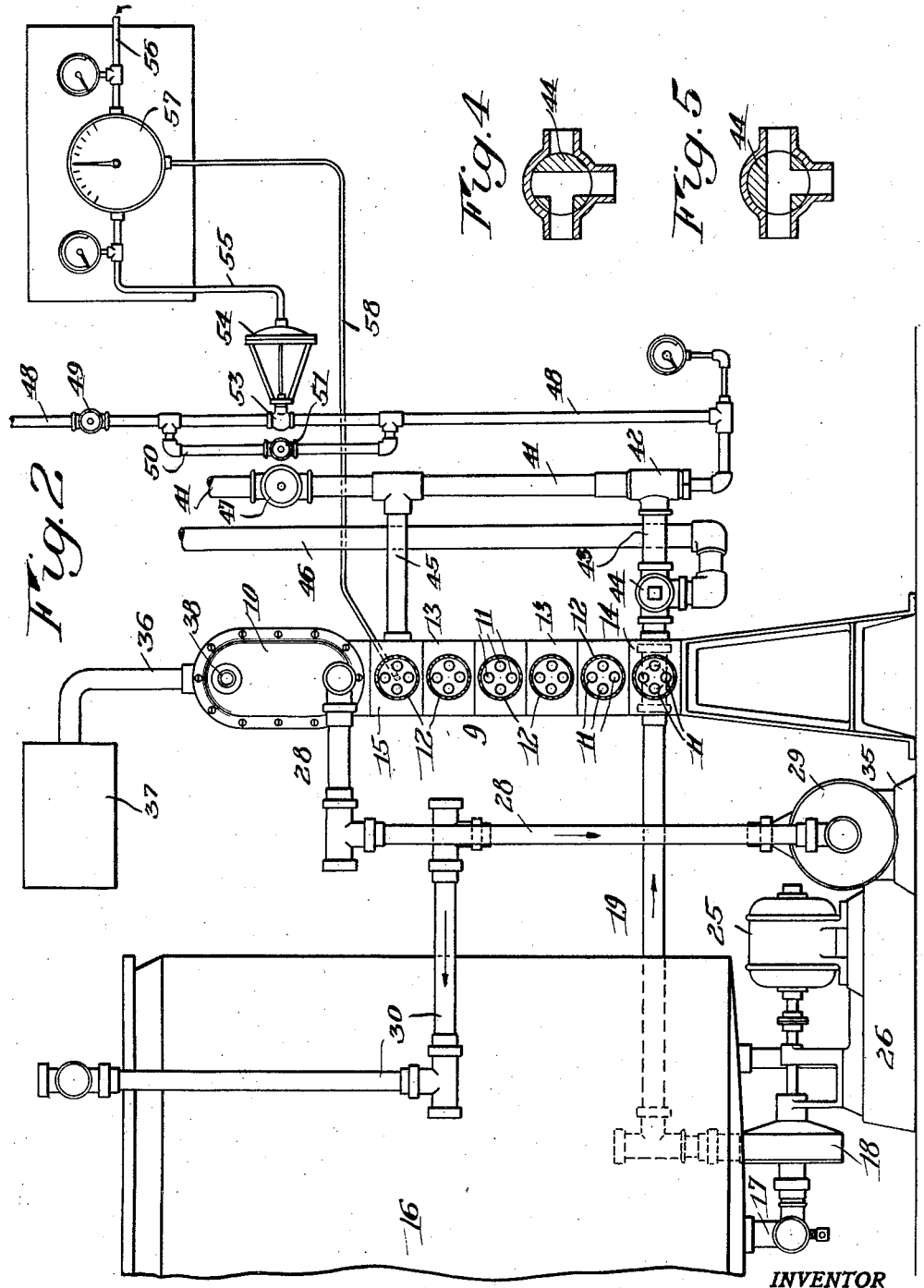

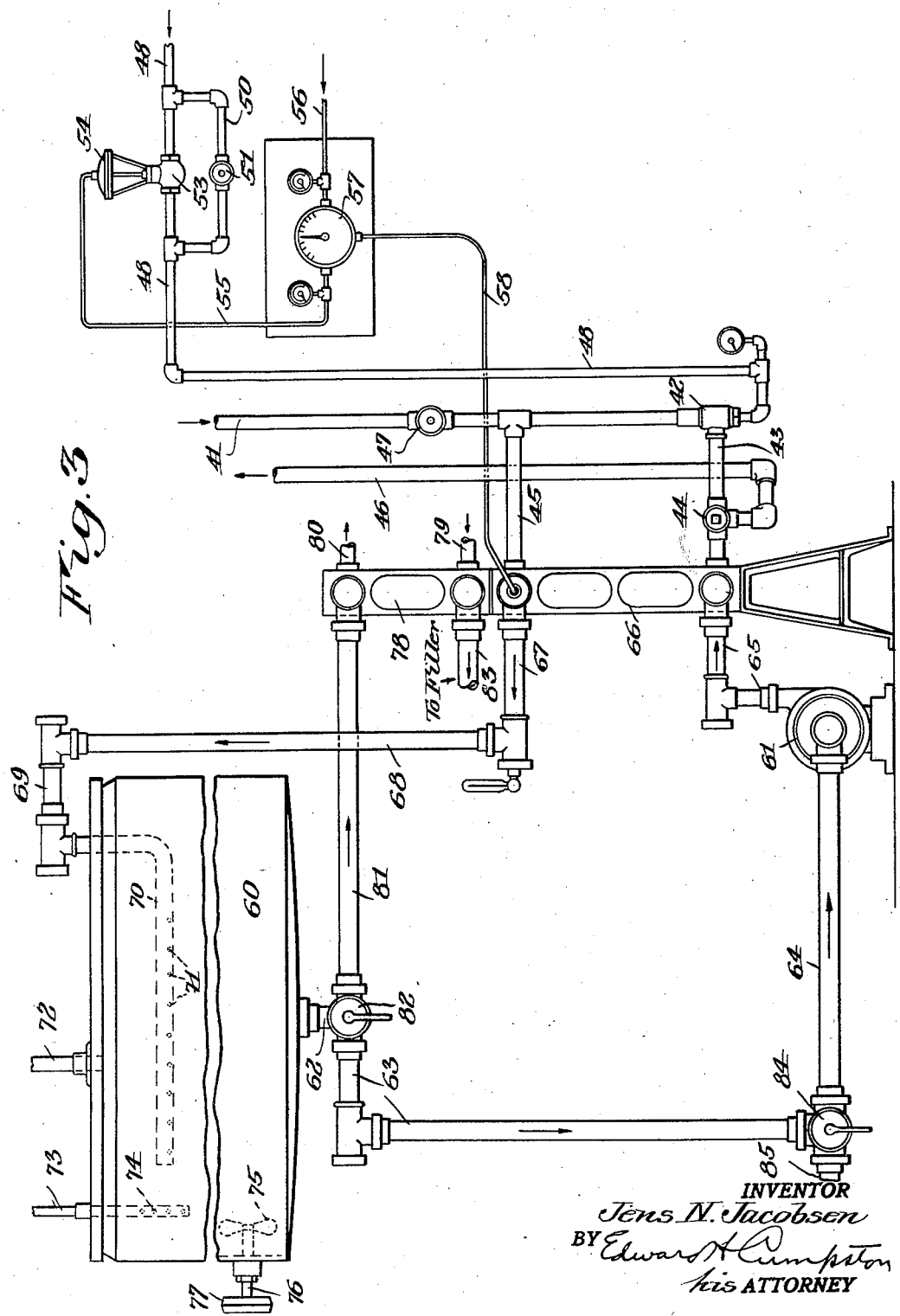

Patented Sept. 11, 1934

1,973,531

UNITED STATES PATENT OFFICE 1,973,531

METHOD FOR TREATING LIQUIDS

Jens N. Jacobsen, Rochester, N. Y., assignor to The Pfaudler Co., Rochester, N. Y., a corporation of New York Application January 21, 1932, Serial No. 587,986

7 Claims. (Cl. 99—15)

The present invention relates to processes and apparatus for treating different liquids or liquid food products for the purpose of preparing and conditioning the same for the market, one object being to provide an improved process by which the treating and conditioning operations are rapidly and effectively performed in an economical and efficient manner.

A further object of the invention is to provide an improved process for treating and removing from milk, cream, and other liquids various objectionable flavors and odors, such for example as occur in milk as the result of onions and certain weeds and the like in the cow's food, the object being to provide an improved process and apparatus for accomplishing this purpose in a rapid and thorough manner.

A further object of the invention is to provide an improved process for heating or cooling liquids in the absence of oxygen in order to eliminate any oxidation which might result from exposure of the liquid to the atmosphere.

A further object of the invention is to provide an improved process for de-aerating and deodorizing milk, cream, and other liquid food products while simultaneously treating the same to destroy certain objectionable bacteria or other organisms therein, as by pasteurization, whereby to complete the processing operations in a minimum amount of time and at a greatly reduced cost.

A further object of the invention is to provide improved apparatus for carrying out the present process which is compact, efficient in service, and which can be conveniently controlled and operated.

A still further object of the invention is to provide an improved heat exchange or transfer unit for use in treating milk, cream, and other liquids.

To these and other ends the invention resides in certain improvements and combinations of parts, all as will be hereinafter more fully described, the novel features being pointed out in the claims at the end of the specification.

In the drawings:

Fig. 1 is a part sectional elevation of apparatus embodying and for carrying out the invention;

Fig. 2 is an elevation partly in section of the apparatus shown in Fig. 1, as viewed from the left thereof;

Fig. 3 is a view in elevation of a modified form of liquid processing apparatus, and Figs. 4 and 5 are enlarged sectional views showing different positions of a valve for controlling the flow of the liquid to the heat exchange unit.

The same reference numerals throughout the several views indicate the same parts.

Reference is hereby made to Patent No. 1,918,914, resulting from a division of the present original application, the divisional application filed August 19, 1932, and having Serial No. 629,527.

The present invention relates to processes and apparatus for treating liquid food products such, for example, as milk, cream and the like, as well as other liquid products. The present method comprises generally the heating or cooling of the liquid during continuous circulation thereof in or through a closed system while at the same time subjecting the liquid to subnormal pressure, either while heating or cooling the same, whereby to remove air and other gaseous and volatile contents. The new process is well adapted, for example, for the pasteurizing of milk, cream and the like and affords a rapid, efficient and economical method of treating and preparing the same for the market without injury to the physical properties of the liquid. With the present method, as previously stated, the liquid is continuously and repeatedly circulated through a closed system while under subnormal pressure for a given period and during this period the liquid may be subjected to agitation by mechanical means or otherwise to assist in the removal of the gases therefrom. The process further comprises subjecting the liquid to a state of relatively fine subdivision while continuously circulating it through a closed system under a partial vacuum, and preferably also comprises the circulation of steam or other gas in contact with the liquid while under subnormal pressure to accelerate the separation and carrying off of the objectionable gases.

The present method may also be employed in the neutralizing process for sour cream in which the neutralizers produce chemical action resulting in the formation of gases. The cream also contains undesirable odors and the gases and odors are more readily separated from as well as absorbed or taken up by the butter fat in the cream when it is heated. The butter fat oxidizes in contact with air and consequently it is important to apply vacuum or subject the cream to subnormal pressure when it is first heated, or during the neutralizing process, in order to then remove the oxygen and other gaseous and volatile constituents which cause objectionable flavors and odors, by liberating and carrying off such constituents as in the method herein described.

The process comprises not only the heating of the liquid while continuously circulating it in a closed system under subnormal pressure for the purpose of liberating and removing the objectionable gases or volatile constituents from the liquid, but also the subjection of the preheated liquid to subnormal pressure while being cooled by continuous circulation in a closed system to further complete the removal of any remaining objectionable gaseous or volatile constituents while at the same time preventing any absorption of or reaction of oxygen from the air upon the liquid as a whole, this being the case both in the heating and cooling operations.

Furthermore the improved heat transfer unit through which the milk is continuously circulated may be employed with a battery of milk pasteurizer-holder tanks for heating the liquid to holding temperature with the butter fat in vacuum and kept from oxidizing, the milk being subsequently cooled for bottling by running it through the heat transfer unit while circulating a cooling medium therethrough. On the other hand, separate heat transfer units may be employed for the heating and cooling operations, either in the treatment of milk or cream, whether in the operations of deodorizing or cooling the same for bottling.

Referring to the drawings, I have shown generally at 9 a unitary heat transfer unit for heating or cooling the liquids which is of the closed type wherein there is a continuous flow of the liquid to be heated or cooled, which is subjected to subnormal pressure while under continuous flow through the unit in order to remove the air and other gaseous contents. This apparatus may take different forms but preferably comprises a tubular construction including a receptacle 10 and one or more tubular sections, such as the inner and outer fluid circulating pipes or tubes 11 and 12, the pipes 11 communicating with the receptacle 10 for the continuous flow of the liquid to be treated and the surrounding tubes 12 receiving the heating or cooling medium which is circulated in a manner hereinafter described. The tube sections 12 are connected one with another by suitable heads 13, the lower or inlet section having a receiving head 14 and the upper or outlet section having a fluid discharging head 15, said heads being connected up with fluid circulating means for the heating or cooling medium, as described hereinafter. The specific relationship of the tubular sections 12 and the tubular receptacle 10 may be varied as desired. In other words, the receptacle 10 may be interposed between certain of the sections 12 or located at the side thereof as may be found advantageous. The advantage of this unified arrangement is that the gases liberated by circulating and heating the treated liquid within the unit are quickly carried off from the receptacle 10 by reason of the partial vacuum produced therein before the liquid has time to cool or to permit the gases to be reabsorbed, as would occur upon passing the liquid from the unit before subjecting it to a partial vacuum.

One or more tanks 16 of the closed type are provided for receiving the liquid to be treated, said tank having a discharge pipe 17 leading therefrom and connected with a suitable pump 18 from which extends a pipe 19 leading to a connection 20 extending within the head 14 and receiving the ends of the pipes 11 in the lower heat exchange section 12. The upper head 15 of the heater is provided with a connection 21 which receives the discharge ends of the pipes 11 in the uppermost section 12 of the heater. From the connection 21 extends a short pipe 22 to a suitable connection 23 from which leads the discharge pipe 24 projecting within the receptacle 10, as shown in Fig. 1. The pump 18 for withdrawing the liquid from the receptacle 16 and circulating it through the heater to the receptacle 10 is operated by a suitable electric motor 25 mounted on a base 26, as shown in Figs. 1 and 2. The liquid may be discharged within the receptacle in a state of relatively fine subdivision, which is accomplished preferably by providing a series of relatively small jet-like openings in the pipe 24 or a number of relatively narrow slots 27, as shown in Fig. 1. With this arrangement the liquid is discharged within the receptacle in the form of a spray or in a state of relatively fine subdivision in order that the objectionable gases may be more readily removed therefrom.

The liquid is drawn from the receptacle 10 through a discharge pipe 28 by means of a pump 29 from which it is discharged through the pipes 30, 31, and 32, the latter extending within and preferably to a point adjacent the bottom of the receiving tank 16 where it is bent to provide a substantially horizontal portion 33 from which the discharging liquid serves to agitate the supply of liquid within the tank, preferably at a point adjacent the outlet of the tank. The operation of the pump 29 to circulate the liquid between the receptacle 10 and the receiving tank 16 is preferably effected by a suitable electric motor 34 mounted on a base 35, as shown in Fig. 1. It will be seen, therefore, that by means of the pumps 18 and 29, continuous circulation of the liquid through a closed system is provided for, the liquid passing from the receiving tank through the heat transfer unit for heating or cooling as the case may be, directly to the receptacle 10 in which it is subjected to a partial vacuum while in a state of relatively fine subdivision, and from which it is withdrawn and returned to the receiving tank. Continuous and repeated circulation of the liquid is thus obtained throughout the processing operations, either in the case of heating or cooling, the circulation and control of the heating and cooling mediums being described hereinafter.

The means for maintaining a partial vacuum within the receptacle 10 to subject the liquid therein to subnormal pressure comprises a pipe 36 connected with the receptacle and extending therefrom to any suitable suction producing apparatus such as that indicated diagrammatically at 37 in Fig. 2.

In the process of continuously circulating the liquid and removing the gases by subjecting it to subnormal pressure, it has been found desirable to employ means to act as an accelerator for liberation of the undesirable gases from the milk or other liquids and to maintain a desired temperature during the circulation and vacuumizing period. This may be done by maintaining a current of steam or other gas in contact with the circulating liquid. To this end there is located within the receptacle any suitable means, such as a pipe 38 provided with a plurality of perforations 39 for discharging a multiplicity of jets of steam within the receptacle while subjecting the liquid therein to subnormal pressure whereby to rapidly and thoroughly release and remove the gases in order that they may be more effectively carried off. The pipe 38 is connected with a supply pipe 40 which is connected with a suitable source of supply, not shown, of steam or heated gas or vapor which may be controlled by suitable means for regulating the flow and temperature of the steam or gas as desired.

Any suitable means may be provided for circulating the heating or cooling medium through the heat transfer unit. With the present arrangement a pipe 41 is connected with a suitable supply of liquid, such as water and carries at its lower end an ejector 42 of any well known type connected with the inlet head 14 of the heat transfer unit by a short pipe 43 having a valve 44 therein for controlling the liquid discharging to the heat transfer unit, which is returned through the outlet head 15 of the heater to a short pipe 45 connected with the supply pipe 41. A pipe 46 is connected with the valve 44 and extended above the heat transfer unit to maintain a head of water into which the steam condensate is passed when the ejector is operating with the valve open thereto as shown in Fig. 5. A valve 47 is provided in the water supply pipe 41 for closing the latter after a supply of water has been allowed to enter the heater to be heated and circulated therethrough by the admission of steam thereto under the control of the ejector.

The ejector is operated in the usual manner by a supply of steam admitted thereto through a supply pipe 48 connected with any suitable steam supply source, the pipe having a valve 49 for controlling the flow of the steam therein. A by-pass pipe 50 is connected with the steam supply pipe and provided with a valve 51 for closing the by-pass under certain operating conditions. The control of the steam supply is preferably regulated by automatic means for operating a valve 53 in the supply pipe 48 comprising fluid pressure means of a well known type. This means includes a diaphragm, not shown, enclosed in a casing 54 and arranged to operate the valve when subjected to air or other fluid under pressure in the supply pipes 55 and 56 having a regulator 57 interposed therein which can be set to afford the desired pressure. The regulator has connected therewith a branch pipe 58 provided with a heat responsive element 59, inserted preferably within the discharge connection 21 of the heat transfer unit and subjected to the flow of the heated milk or other liquid discharging to the vacuum controlled receptacle 10. It will be understood that as the temperature of the circulating liquid rises or falls that the pressure in the pipes connecting the element 59 with the diaphragm casing 54 will likewise vary so that the valve 53 will be automatically shifted to maintain a substantially constant temperature in said heater by controlling the supply of steam as described. If it is desired to supply the steam without control of the automatic means this can be done by opening the valve 51 and allowing the steam to be by-passed through the pipe 50.

When it is desired to circulate a cooling medium through the heat transfer unit to cool the liquid flowing through the pipes 11 the steam pipe valve 49 is closed and the valve 47 in the water supply pipe is opened, at which time the valve 44 is closed to the ejector as shown in Fig. 4. The cold water or other suitable cooling liquid is then permitted to enter the heat transfer unit through the pipe 45 and to continuously circulate through the heat transfer unit as long as desired, it being understood that the cooling liquid during this period will be discharging through the overflow pipe 46, at which time the valve 44 is in the position shown in Fig. 4.

In the modification shown in Fig. 3, the small vacuumizing receptacle 10 of the heat transfer unit has been omitted and the liquid circulating heat transfer unit is connected directly to one or more of the larger receiving tanks in which arrangement an additional heat transfer unit is provided in conjunction with the main heat transfer unit. The additional unit is particularly adapted for use as a cooler arranged to discharge to a suitable filler, not shown, for delivering the liquid to bottles or other receptacles after the pasteurizing process has been completed. The apparatus shown in Fig. 3 comprises one or more receiving tanks 60 through which the milk or other liquid to be treated is continuously circulated by means of a pump 61 which withdraws the liquid from the bottom of the tank through a T-connection 62 and pipes 63 and 64, discharging it through connections 65 for delivery to a heat transfer unit 66 similar to that shown in Figs. 1 and 2. From this unit the liquid is returned to the tank 60 through pipes 67, 68, and 69 and the spray pipe 70 within the tank having a series of small openings 71 through which the liquid is discharged in a form of a spray and consequently in a state of relatively fine subdivision, preferably at a point adjacent the top of the tank.

The liquid discharging within the tank 60 is subjected to subnormal pressure by producing therein a partial vacuum through the medium of a suction pipe 72 connected with any suitable suction or vacuum producing means, whereby to provide for the removal of the objectionable gases liberated from the liquid. To this end means has also been provided for accelerating the flow of the gases given off by the liquid while under subnormal pressure. This is done in the manner described above in connection with the apparatus shown in Figs. 1 and 2, by extending within the top of the container a steam supply pipe 73 provided with a plurality of perforations 74 for discharging a multiplicity of jets of steam into the circulating liquid to release and to rapidly and thoroughly remove the gases in order that they may be more effectively carried off under the partial vacuum maintained within the tank.

It is also desirable to provide within the receiving tank 60 means for increasing the agitation of the liquid and to increase the circulation of the same for the purpose of more effectively liberating the gases and to this end a propeller 75 or other suitable agitating means is placed within the tank, preferably near the bottom thereof, the propeller being operated by a shaft 76 having a pulley 77 thereon arranged to be driven by a belt, not shown.

The means for supplying a heating or cooling medium to the heat transfer unit 66 for circulation therethrough is the same as that shown in Figs. 1 and 2 and the corresponding parts have therefore been given the same reference characters, it being understood that the construction and method of operation is the same in each case.

The same is also true with respect to the temperature controlled fluid pressure apparatus for automatically controlling the operation of the steam regulating valve 53 and therefore the corresponding parts have been given the same reference characters, the heat responsive element 59 being similarly positioned and connected up in each case.

Associated with the heat transfer unit 66 shown in Fig. 3 is a similar unit 78, provided with inlet and outlet pipes 79 and 80 for the admission and discharge of the heat exchange medium which may be either a cooling or heating medium, it being understood that the construction of this unit is the same, or along the same lines of the heat transfer unit shown in Figs. 1 and 2. Preferably the unit 78 is employed as a cooler for the milk treated or pasteurized in the tank 60 and in this particular usage, brine or some other suitable cooling medium is circulated through the unit by any preferred means, not shown, connected with the inlet and outlet pipes 79 and 80 thereof.

The milk or other products after being properly treated in the tank 60 is drawn off through valve 82 which is set so as to close the pipe 63 and to open pipe 81 in order that the treated product in tank 60 may be discharged by gravity or otherwise to and through the heat transfer unit 78 and thence through the pipe 83 to the filling machine, not shown. The product in passing through the heat transfer unit 78 is cooled to about 40° F., by using any suitable cooling medium, the temperature of which is lower than the final temperature to which the product is to be cooled. Where it is desired to convey the liquid directly to or from the tank 60 through pipes 62, 63, and 85, this can be done by setting the valves 82 and 84 to place said pipes in communication while at the same time closing the pipes 81 and 84.

There are cases where the product, such as buttermilk, is treated in the tank 60 at a final temperature of about 70° F., and after being treated in the manner above described by circulation through a heat transfer unit 66, it is desirable to cool the liquid to about 40° F. without too much agitation, and for this purpose the unit 78 is provided.

It will be understood that the vacuum chamber in the receptacle 10 of the heat exchange unit will have sufficient height to permit of separation of the gases from the milk without causing the milk or other liquid to be withdrawn from the receptacle by the vacuum producing means. On the other hand, the partial vacuum will be so regulated as not to result in the overheating or boiling of the milk while circulating through the heating unit under subnormal pressure or partial vacuum. The receptacle 10 constitutes a more or less integral part of the heat exchange unit and the liquid to be treated therein may not only be subjected to the action of the circulating heat exchange medium, but to the supply of steam admitted to the receptacle for the purposes of removing the gases from the liquid in the pasteurizing operations.

The rate of discharge of the liquid from the tank through the outlet pipe 28 may be controlled by regulating the degree of suction produced by the pump 29. Furthermore suitable means, not shown, may be provided within the tank for temporarily delaying the passage of the liquid therefrom in order that it may be subjected for the proper length of time to the influence of the partial vacuum to better insure removal of the gases.

The processes carried out in the operation of the apparatus shown may be varied according to the particular kind of liquid to be processed and the nature of the treatments required therefor. For example in the pasteurization of a batch of milk supplied to the receiving tank 16, the milk is drawn off from the latter by the pump 18 and circulated through the heat transfer unit under pasteurizing temperatures produced by the heating medium being circulated through the unit, which is kept at the correct temperature by the automatic temperature control means provided. From the heater the milk passes directly to the receptacle 10 where it is subjected to a state of relatively fine subdivision, preferably by being sprayed therein. Continuous circulation of the liquid through the receptacle is insured by operation of the pump 29 which returns the liquid to the receiving tank 16 where it is discharged near the bottom thereof to insure a certain degree of agitation and circulation of the milk within the tank. The milk while being thus continuously and repeatedly circulated through the system at pasteurizing or other temperatures is constantly subjected to subnormal pressure while in a state of relatively fine subdivision within the receptacle 10, in which a partial vacuum is produced by applying suction through the pipe 36 to carry off the liberated gases. This operation is facilitated by discharging a current of steam or gas through the pipe 38 in contact with the circulating liquid. This treatment is continued without interruption until the liquid has been properly de-aerated and deodorized to remove the undesirable flavors and odors therefrom.

When the pasteurizing operations have been completed a cooling medium is circulated through the heat transfer unit and at the same time the pasteurized milk is recirculated therethrough and cooled to the desired temperature, after which it is ready for bottling.

The pasteurizing process is carried out in the same manner with the apparatus shown in Fig. 3, in which the smaller vacuum tank on the heater is omitted, the de-aerating and deodorizing of the liquid taking place in the larger tank 60 in which increased agitation is preferably provided by the use of suitable means such as the propeller 75. In this modification the cooling of the milk after it has been pasteurized is preferably effected by circulating it through the heat transfer unit 78 and direct to the filler, not shown.

It will be seen, therefore, that with either form of apparatus shown, milk may be pasteurized in a closed system by continuously circulating and subjecting it to subnormal pressure, as distinguished from the method heretofore employed of first pasteurizing the milk and thereafter employing means to de-aerate and deodorize the same. The advantages and economies resulting from the new method will be apparent when considering the saving in time and cost of operation afforded over the previous methods employed.

The apparatus is also adapted for use in the treating of sour cream from which it is desired to remove the objectionable flavors and odors. In this treatment the neutralizers produce chemical action, resulting in the formation of gases which are absorbed or taken up readily by butter fat in the cream when heated and melted. The butter fat oxidizes in contact with air and consequently it is important to apply vacuum when the cream is first heated during the neutralizing process. By heating and continuously circulating the cream through either of the closed systems shown, while under subnormal pressure and in a state of subdivision as provided for, the objectionable gases and odors can be rapidly removed, and when the processing operation is completed the cream can be recirculated through the heat transfer unit to lower the temperature to the desired degree by use of a cooling medium circulating through the unit.

In addition to the above usages, the heat transfer unit may be employed with a battery of milk pasteurizer-holder tanks for heating to holding temperature, in which case the butter fat which by vacuum is kept from oxidizing while maintained in the closed system as provided for. In this process the milk may also be recirculated through the heat transfer unit and cooled therein and thus prepared for bottling. In the modification shown in Fig. 3 the separate heat transfer units 66 and 78 may be used one for heating and the other for cooling, as will be understood.

The invention is further useful in the treatment of cream, merely to remove the objectionable flavors and odors therefrom, which can be done by heating and circulating the cream through the closed system while under subnormal pressure to liberate and carry off the gases, after which recirculation is effected to cool the cream preparatory to bottling.

It will be understood that liquid to be treated is constantly maintained under subnormal pressure in a closed system, in which it is continuously circulated during treatment, free from the effects of atmospheric conditions. The removal of the gases and objectionable flavors and odors may be effected not only by heating the liquid while circulating in the closed system, but like results may also be accomplished by subjecting liquid which has been brought to an elevated temperature to the surfaces of a cooling medium. The invention is adapted not only for the uses described, but for others as well and comprises de-aerating under subnormal pressure while heating or cooling a continuous flow of the liquid in a closed system of the character provided. By provding a vacuum chamber as a substantially integral part of the heater or cooler, in conjunction with a closed circulating system as shown, I have effected marked economy in the operations of processing liquids to an extent not possible with the different types of liquid processing apparatus now on the market.

I claim:

1. The process of treating milk and the like for the purpose described, comprising continuously circulating the milk through a closed heat transfer unit, subjecting the milk to a state of relatively fine subdivision and to partial vacuum within the unit while circulating it therethrough, pasteurizing the milk during the circulating period by circulating a heating medium through the unit, subsequently recirculating the pasteurized milk through said unit while in a heated state and at the same time circulating a cooling medium through the unit to cool the milk circulating therethrough.

2. The process of treating milk and the like, which comprises continuously and repeatedly circulating the milk through a closed circuit in one part of which the milk flows for a substantial distance in a relatively thin stream, maintaining a heating medium in proximity to the last mentioned part of the circuit to pasteurize the milk circulating therethrough, and subdividing the milk in another part of the circuit and at the same time subjecting the subdivided milk to intimate contact with a supply of gas to facilitate removal of gases from the milk.

3. The process of treating milk and the like, which comprises continuously and repeatedly circulating the milk through a closed circuit in one part of which the milk flows in a relatively thin stream, circulating a heating medium in surrounding relation with respect to the last mentioned part of the circuit to pasteurize the milk circulating therethrough, subdividing the milk in another part of the circuit and at the same time subjecting it to intimate contact with a supply of gas and to subnormal pressure to facilitate removal of gases from the milk, subsequently circulating the pasteurized milk through the circuit and at the same time circulating a cooling medium in surrounding relation with respect to said first mentioned part of the circuit to cool the milk flowing therethrough.

4. The process of treating milk and the like, which comprises continuously circulating the milk through a closed system in a portion of which it flows for a substantial distance in a relatively thin stream and in another portion of which it is maintained in substantial volume while continuing its flow, subjecting the milk in the second mentioned portion of the system to a state of relatively fine subdivision and to a partial vacuum while subdividing the same, employing means in the second mentioned portion of the system to facilitate removal of the gases from the milk while circulating therethrough, and subjecting the milk flowing in said relatively thin stream to the presence of heat to pasteurize the same.

5. The process of treating milk and the like, which comprises continuously circulating the milk through a closed system in a portion of which it flows for a substantial distance in a relatively thin stream and in another portion of which is it maintained in substantial volume while continuing its flow, subjecting the milk in the first mentioned portion of the system to the presence of heat to pasteurize it while continuing to flow through the system, subdividing the milk in the second mentioned portion of the system while flowing therein, and subjecting it to a partial vacuum while in said state of subdivision to remove the gases therefrom.

6. The process of treating milk and the like, which comprises continuously and repeatedly circulating the milk through a closed system in one part of which the milk flows for a substantial distance in a relatively thin stream, maintaining the milk in substantial volume in another portion of the system while continuing its flow therethrough, subjecting the milk while flowing in said relatively thin stream to the presence of heat to pasteurize the same, employing means to agitate the milk in that part of the system in which said substantial volume is maintained to effectively increase liberation of the gases from the milk, and subjecting the milk to subnormal pressure while flowing through the system to facilitate removal of the gases therefrom.

7. The process of treating milk and the like, which comprises continuously and repeatedly circulating the milk through a closed system in a portion of which the milk flows for a substantial distance in a relatively thin stream and in another portion of which it is maintained in substantial volume while continuing its flow through the system, circulating a heating medium in surrounding relation to the milk flowing through a part of the first mentioned portion of the system to pasteurize it therein, subjecting the milk to subnormal pressure while flowing through the system, and employing means in that part of the system in which said substantial volume is maintained to agitate the milk to effect liberation of the gases from the milk.

JENS N. JACOBSEN.